US010292064B2

(12) United States Patent
Yang et al.

(10) Patent No.: US 10,292,064 B2
(45) Date of Patent: May 14, 2019

(54) DETECTION AND REPORTING OF A COLLISION EVENT

(71) Applicant: QUALCOMM Incorporated, San Diego, CA (US)

(72) Inventors: Yue Yang, San Diego, CA (US); Madhusudan Kinthada Venkata, San Diego, CA (US); Manjinder Singh Sandhu, Poway, CA (US); Srinivasan Balasubramanian, San Diego, CA (US); Raj Pratha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/428,939

(22) Filed: Feb. 9, 2017

(65) Prior Publication Data

US 2017/0265102 A1 Sep. 14, 2017

Related U.S. Application Data

(63) Continuation of application No. 62/306,062, filed on Mar. 9, 2016.

(51) Int. Cl.
*H04W 24/08* (2009.01)
*G08B 21/18* (2006.01)
(Continued)

(52) U.S. Cl.
CPC ........... *H04W 24/08* (2013.01); *B60R 21/013* (2013.01); *G08B 25/016* (2013.01); *G08G 1/205* (2013.01); *H04W 74/0858* (2013.01)

(58) Field of Classification Search
CPC .............. H04W 24/08; H04W 74/0858; G08B 25/016; G08G 1/205
See application file for complete search history.

(56) References Cited

U.S. PATENT DOCUMENTS 9,102,261 B2 8/2015 Chang
2002/0037707 A1* 3/2002 Yoshioka .............. B60R 25/102
455/404.2
(Continued)

FOREIGN PATENT DOCUMENTS

EP 2631125 A1 8/2013
GB 2435536 A 8/2007
WO WO-2015187444 A2 12/2015

OTHER PUBLICATIONS

ISA/EP, International Search Report and Written Opinion of the International Searching Authority, Int'l Application No. PCT/US2017/017474, dated Nov. 3, 2017, European Patent Office, Rijswijk, NL, 21 pgs.

(Continued)

*Primary Examiner* — Kiet Tang
(74) *Attorney, Agent, or Firm* — Holland & Hart LLP

(57) ABSTRACT

Enhanced techniques may be used for identifying and reporting collision-based scenarios. In one example, a wireless modem measures a number of signals received from a number of devices that are located on the same chip as the wireless modem when a physical link between the wireless modem and an accelerometer is broken, the accelerometer is inoperable, or a combination thereof. In the event of a collision event, the wireless modem may use the measured signals to determine that the collision event has occurred and may transmit an indication of the collision event. For instance, the wireless modem may use signals from an audio sensor, a motion sensor, a global navigation satellite system (GNSS), or the like.

30 Claims, 15 Drawing Sheets

(51) Int. Cl.
    *B60T 7/22*     (2006.01)
    *B60R 25/102*   (2013.01)
    *H04W 16/14*    (2009.01)
    *G08B 25/01*    (2006.01)
    *G08G 1/00*     (2006.01)
    *H04W 74/08*    (2009.01)
    *B60R 21/013*   (2006.01)

(56) References Cited

U.S. PATENT DOCUMENTS

| | | | |
|---|---|---|---|
| 2011/0032915 A1* | 2/2011 | Han | H04W 16/14 |
| | | | 370/338 |
| 2011/0095940 A1 | 4/2011 | Breed | |
| 2014/0094989 A1 | 4/2014 | Dadu et al. | |
| 2015/0187217 A1* | 7/2015 | Yao | B60T 7/22 |
| | | | 701/301 |
| 2015/0307048 A1 | 10/2015 | Santora | |
| 2015/0356853 A1* | 12/2015 | Cronin | G08B 21/182 |
| | | | 340/669 |
| 2016/0052473 A1 | 2/2016 | Debenham et al. | |

OTHER PUBLICATIONS

Bhavthankar S., et al., "Wireless System for Vehicle Accident Detection and Reporting using Accelerometer and GPS", International Journal of Scientific and Engineering Research, vol. 6, No. 8, Aug. 2015, pp. 1069-1072.

ISA/EPO, Partial International Search Report of the International Searching Authority, Int'l. App. No. PCT/US2017/017474, dated Jun. 21, 2017, European Patent Office, Rijswijk, NL; 15 pgs.

* cited by examiner

DETECTION AND REPORTING OF A COLLISION EVENT

CROSS REFERENCES

The present application for patent claims priority to U.S. Provisional Patent Application No. 62/306,062 by Yang, et al., entitled "Detection and Reporting of a Collision Event," filed Mar. 9, 2016, assigned to the assignee hereof.

BACKGROUND

The following relates generally to wireless communication, and more specifically to detecting a collision event and reporting the collision event using a wireless modem. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless modem may be used to facilitate transmission and reception of wireless signals within a wireless communications system. In some scenarios, the wireless modem may be used to autonomously communicate in an emergency situation. For instance, the wireless modem may be included in a vehicle and used to transmit a distress signal after identifying a collision event has occurred. In some cases, the wireless modem may fail to identify the collision event (e.g., due to damage of a component or a wired communication link) and, therefore, may fail to report that the collision event has occurred. In other cases, the wireless modem may identify that the collision event has occurred but may be damaged and incapable of transmitting the distress signal.

SUMMARY

Enhanced techniques may be used for identifying and reporting collision-based scenarios. In one example, a wireless modem measures a number of signals received from a number of devices that are located on the same chip as the wireless modem when a physical link between the wireless modem and an accelerometer is broken, the accelerometer is inoperable, or a combination thereof. In the event of a collision event, the wireless modem may use the measured signals to determine that the collision event has occurred and may transmit an indication of the collision event. For instance, the wireless modem may use signals from an antenna, an audio sensor, a motion sensor, a global navigation satellite system (GNSS), or the like. In another example, a wireless modem may be included in a delivery package and used to transmit an indication of a collision event of the delivery package to a distributor.

A method of wireless communication is described. The method may include measuring, at the wireless modem, a plurality of signals associated with a corresponding plurality of devices located on a same chip as the wireless modem, predicting or identifying, at the wireless modem, a period of time at which a collision event can occur based at least in part on the measured plurality of signals, estimating, at the wireless modem, a probability that a collision event will occur at the identified period of time, based at least in part on the measured plurality of signals, determining, at the wireless modem, that the collision event has occurred occur based at least in part on the measured plurality of signals and estimation, and transmitting, from the wireless modem, an indication that the collision event has occurred based at least in part on the determining. In some cases, the measuring may occur when a physical link between the wireless modem and an accelerometer is broken, the accelerometer is inoperable, or a combination thereof.

An apparatus for wireless communication is described. The apparatus may include means for measuring, at the wireless modem, a plurality of signals associated with a corresponding plurality of devices located on a same chip as the wireless modem, means for predicting, at the wireless modem, a period of time at which a collision event can occur based at least in part on the measured plurality of signals, means for estimating, at the wireless modem, a probability that a collision event will occur at the identified period of time, based at least in part on the measured plurality of signals, means for determining, at the wireless modem, that a collision event has occurred based at least in part on the measured plurality of signals and estimation, and means for transmitting, from the wireless modem, an indication that the collision event has occurred based at least in part on the determining. In some cases, the measuring may occur when a physical link between the wireless modem and an accelerometer is broken, the accelerometer is inoperable, or a combination thereof.

A further apparatus is described. The apparatus may include a processor, memory in electronic communication with the processor, and instructions stored in the memory. The instructions may be operable to cause the processor to measure, at the wireless modem, a plurality of signals associated with a corresponding plurality of devices located on a same chip as the wireless modem, predict or identify, at the wireless modem, a period of time at which a collision event can occur based at least in part on the measured plurality of signals, estimate, at the wireless modem, a probability that a collision event will occur at the identified period of time, based at least in part on the measured plurality of signals, determine, at the wireless modem, that the collision event has occurred occur based at least in part on the measured plurality of signals and estimation, and transmit, from the wireless modem, an indication that the collision event has occurred based at least in part on the determining. In some cases, the measuring occurs when a physical link between the wireless modem and an accelerometer is broken, the accelerometer is inoperable, or a combination thereof.

A non-transitory computer readable medium for wireless communication is described. The non-transitory computer-readable medium may include instructions to cause a processor to measure, at the wireless modem, a set of signals associated with a corresponding set of devices located on a same chip as the wireless modem, predict or identify, at the wireless modem, a period of time at which a collision event can occur based at least in part on the measured plurality of signals, estimate, at the wireless modem, a probability that a collision event will occur at the identified period of time, based at least in part on the measured plurality of signals, determine, at the wireless modem, that a collision event has occurred based on the measured set of signals and transmit, from the wireless modem, an indication that the collision event has occurred based on the determining. In some cases, the measuring occurring when a physical link between the wireless modem and an accelerometer is broken, the accelerometer is inoperable, or a combination thereof Some examples of the method, apparatus, or non-transitory computer-readable medium described above may further include processes, features, means, or instructions for receiving, at the wireless modem, a signal of the set of signals from the accelerometer via a wireless link and/or a wired link.

In some examples of the method, apparatus, or non-transitory computer-readable medium described above, the signal indicates an acceleration or a deceleration of the wireless modem.

Some examples of the method, apparatus, or non-transitory computer-readable medium described above may further include processes, features, means, or instructions for receiving, at the wireless modem, a signal of the set of signals from a wireless device within communication range of the wireless modem, the signal is received via a shared radio frequency spectrum band, and the signal is indicative of a position, a velocity, an acceleration, or a combination thereof, of the wireless device.

In some examples of the method, apparatus, or non-transitory computer-readable medium described above, the transmitting comprises: transmitting the indication that the collision event has occurred to a wireless device within communication range of the wireless modem via a shared radio frequency spectrum band. In some examples of the method, apparatus, or non-transitory computer-readable medium described above, the indication is transmitted to a dispatcher through the wireless device.

In some examples of the method, apparatus, or non-transitory computer-readable medium described above, the transmitting comprises: scanning for an available channel in a shared radio frequency spectrum band. Some examples of the method, apparatus, or non-transitory computer-readable medium described above may further include processes, features, means, or instructions for transmitting an emergency prose code on the available channel.

Some examples of the method, apparatus, or non-transitory computer-readable medium described above may further include processes, features, means, or instructions for comparing a signal of the set of signals to a threshold, where the determining comprises determining that the signal is greater than the threshold.

Some examples of the method, apparatus, or non-transitory computer-readable medium described above may further include processes, features, means, or instructions for applying a weighting value to the signal, where the comparing comprises comparing the weighted signal to the threshold.

In some examples of the method, apparatus, or non-transitory computer-readable medium described above, the wireless modem is in an idle mode or a connected mode prior to the determining. Some examples of the method, apparatus, or non-transitory computer-readable medium described above may further include processes, features, means, or instructions for maintaining, at the wireless modem, a history of a movement of the wireless modem, where the determining comprises determining that a present movement of the wireless modem is inconsistent with the history of the movement.

In some examples of the method, apparatus, or non-transitory computer-readable medium described above, the corresponding set of devices comprises the accelerometer, a global navigation satellite system (GNSS), a motion sensor, an audio sensor, a thermal sensor, a reception analyzer, a Doppler estimator, a wireless device, a history logger, or a combination thereof.

In some examples of the method, apparatus, or non-transitory computer-readable medium described above, the set of signals indicate: a position of the wireless modem, a direction of the wireless modem, a velocity of the wireless modem, an acceleration or deceleration of the wireless modem, an auditory signal received at the wireless modem, a temperature of the wireless modem, a Doppler pattern identified by the wireless modem, a signal strength of a cellular signal, or a combination thereof.

Some examples of the method, apparatus, or non-transitory computer-readable medium described above may further include processes, features, means, or instructions for receiving, from a dispatcher, a voice call in response to the indication that the collision event has occurred. Some examples of the method, apparatus, or non-transitory computer-readable medium described above may further include processes, features, means, or instructions for transmitting, to a dispatcher, a voice call based on the determining that the collision event has occurred.

A method of wireless communication is described. The method may include measuring, at the wireless modem, a signal received from a motion sensor, wherein the wireless modem and the motion sensor are located on a same chip and coupled with a delivery package, determining, at the wireless modem, that a collision event has occurred based at least in part on the measured signal and transmitting, from the wireless modem to a distributor, an indication that the collision event has occurred based at least in part on the determining.

An apparatus for wireless communication is described. The apparatus may include means for measuring, at the wireless modem, a signal received from a motion sensor, wherein the wireless modem and the motion sensor are located on a same chip and coupled with a delivery package, means for determining, at the wireless modem, that a collision event has occurred based at least in part on the measured signal and means for transmitting, from the wireless modem to a distributor, an indication that the collision event has occurred based at least in part on the determining.

A further apparatus is described. The apparatus may include a processor, memory in electronic communication with the processor, and instructions stored in the memory. The instructions may be operable to cause the processor to measure, at the wireless modem, a signal received from a motion sensor, wherein the wireless modem and the motion sensor are located on a same chip and coupled with a delivery package, determine, at the wireless modem, that a collision event has occurred based at least in part on the measured signal and transmit, from the wireless modem to a distributor, an indication that the collision event has occurred based at least in part on the determining.

A non-transitory computer readable medium for wireless communication is described. The non-transitory computer-readable medium may include instructions to cause a processor to measure, at the wireless modem, a signal received from a motion sensor, where the wireless modem and the motion sensor are located on a same chip and coupled with a delivery package, determine, at the wireless modem, that a collision event has occurred based on the measured signal and transmit, from the wireless modem to a distributor, an indication that the collision event has occurred based at least in part on the determining.

Some examples of the method, apparatus, or non-transitory computer-readable medium described above may further include processes, features, means, or instructions for comparing the signal to a threshold, where the determining comprises determining that the signal is greater than the threshold.

In some examples of the method, apparatus, or non-transitory computer-readable medium described above, the signal indicates: a position of the wireless modem, a direction of the wireless modem, a velocity of the wireless modem, an acceleration or deceleration of the wireless modem, or a combination thereof. In some examples of the method, apparatus, or non-transitory computer-readable medium described above, the wireless modem and the motion sensor are attached to the delivery package, placed within the delivery package, or a combination thereof.

DETAILED DESCRIPTION

Figure 1:
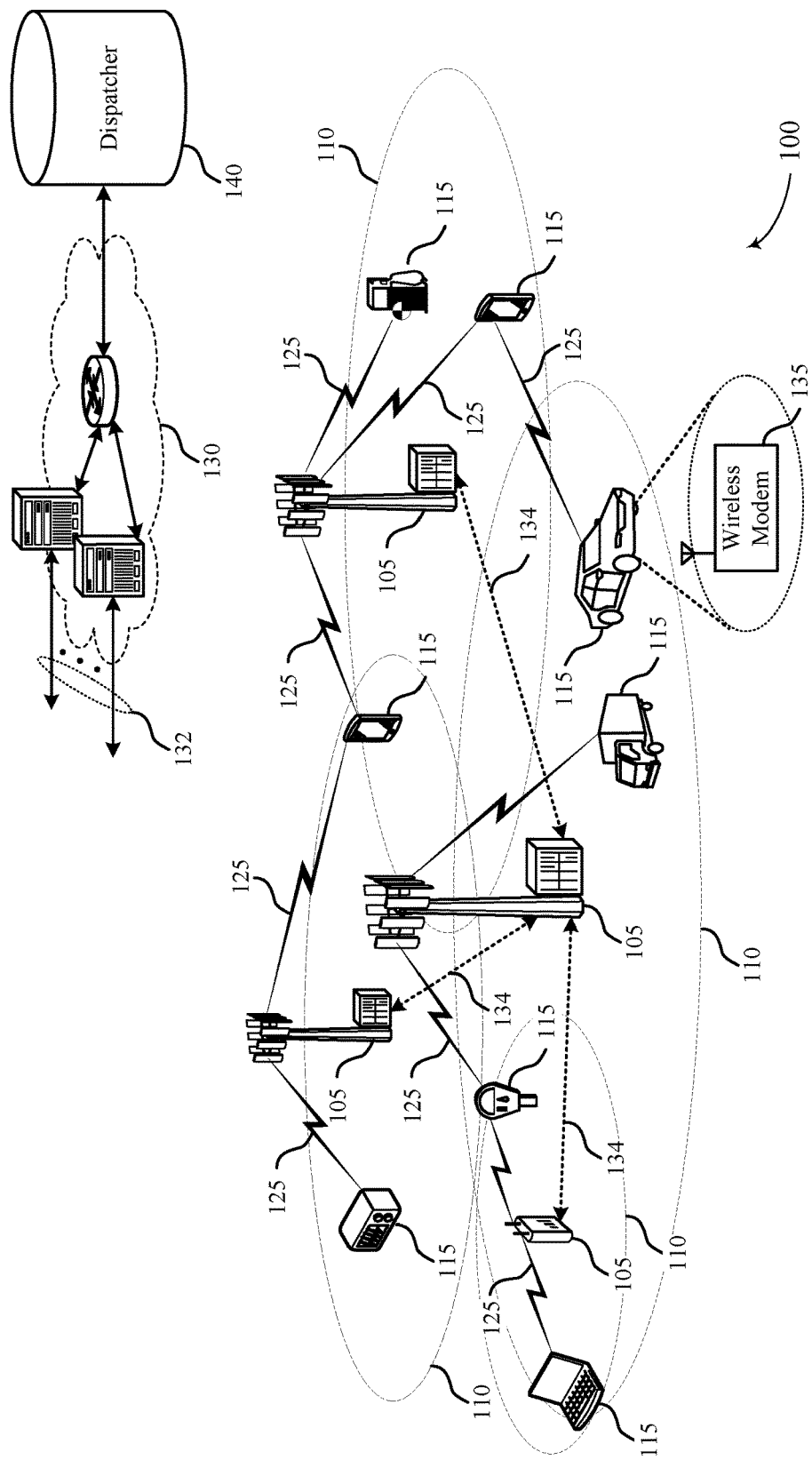
FIG. 1 illustrates an example of a wireless communications system that supports detecting and reporting collision events in accordance with various aspects of the present disclosure.

Enhanced techniques may be used for identifying and reporting collision-based scenarios. In some examples, a wireless modem is included in a consumer product such as a vehicle (e.g., a bicycle, motorcycle, automobile, etc.). The wireless modem may be used for communication purposes, such as voice, data, etc. In some cases, the wireless modem may also be used for emergency reporting, for instance in the case of a collision. The wireless modem may use an accelerometer to determine whether a collision event (e.g., an abrupt change in speed, direction, etc.) has occurred and to trigger emergency reporting. However, in some cases the accelerometer or a link between the accelerometer and the wireless modem may be damaged or broken and incapable of taking or delivering measurements to the wireless modem. For instance, the accelerometer may be damaged prior to the collision event or during the collision event itself.

In such a scenario, the wireless modem may use signals measured from other devices (e.g., a wireless signal received at an antenna, an audio device, a motion sensor, etc.) that are located on the same chip as the wireless modem to identify a collision event. For instance, the wireless modem may compare a signal or a collection of signals against one or more thresholds to determine if a collision event has occurred. After identifying a collision event has occurred, the wireless modem may transmit an indication that the collision event has occurred.

In some other cases, the wireless modem may utilize one or more signals measured from the other devices located on the same chip as the wireless modem to predict or identify a period of time at which a collision event may occur or has occurred. For instance, the wireless modem may utilize the signals measured at a first time (e.g., 50 milliseconds) before the predicted collision time, and signals measured at a second time (e.g., 50 milliseconds) after the predicted collision time to determine if a collision event has occurred. In some other cases, the wireless modem or a decision making unit (e.g., on-board computer, processor, etc.), may compare the two sets of signals measured over a time span (e.g., 100 milliseconds) to determine if the collision event has occurred.

In another example, a wireless modem is included in a delivery package and coupled with a motion sensor. In some examples, the wireless modem may use signals measured from the motion sensor to determine that a collision event has occurred and may transmit an indication that the collision event has occurred to a distributor. Features of the disclosure introduced above are further described below in the context of a wireless communication system. Specific examples are then described of an example process flow for detecting and reporting a collision event. These and other features of the disclosure are further illustrated by and described with reference to apparatus diagrams, system diagrams, and flowcharts that relate to detecting and reporting a collision event.

FIG. 1 illustrates an example of a wireless communications system 100 in accordance with various aspects of the present disclosure. The wireless communications system 100 includes base stations 105, UEs 115, a core network 130, and a dispatcher. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, a vehicle (e.g., an automobile, bicycle, motorcycle, etc.), a delivery package, etc. UEs 115 may include a wireless modem 135 used for communicating in the wireless communications system 100.

Base stations 105 may communicate with the core network 130, a dispatcher 140, and with one another. For example, base stations 105 may interface with the core network 130 through backhaul links 132 (e.g., S1, etc.).

Base station 105 may interface either directly with dispatcher 140, or indirectly with dispatcher 140 via core network 130 or another base station 105. Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may support device-to-device (D2D) communications in an licensed or shared frequency spectrum band. For example, a UE 115 may communicate with a neighboring UE 115 via a direct wireless link (e.g., a Wi-Fi, Bluetooth, LTE-D link, etc.) in the licensed or shared frequency spectrum band. The UE 115 may perform D2D communications in a manner which is consistent with D2D communication protocols and which complies with regulatory requirements for communicating in the licensed or shared frequency spectrum band. For example, the UE may transmit a message in the unlicensed frequency spectrum band that is associated with D2D data communications. The messages may, in some examples, be interleaved across multiple tones (or frequencies) of the unlicensed frequency spectrum band. The UE 115 may transmit D2D data communications according to a scheduling assignment message, e.g., using a frequency, modulation-and-coding scheme (MCS), etc., as signaled in the scheduling assignment message.

In the wireless communications system 100, some UEs may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices (e.g., wireless modems 135) that integrate sensors or meters to measure or capture information and relay that information to a central server, such as a dispatcher 140, or application program that can make use of the information. In one example, the information relayed to a dispatcher may be displayed to humans interacting with the program or application (e.g., call centers, package distribution centers, etc.).

Some UEs 115 in wireless communications system 100 may be MTC devices, such as those designed to collect information or enable automated behavior of machines. Examples of applications for MTC devices include smart metering, inventory monitoring, equipment monitoring, healthcare monitoring, wildlife monitoring, weather and geological event monitoring, fleet management and tracking, remote security sensing, physical access control, transaction-based business charging, and collision monitoring. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of the internet-of things (IoT) and autonomously communicate with one another.

A wireless modem 135 may communicate with base stations 105, dispatchers 140, a core network 130, or other UEs 115 over the licensed or shared frequency spectrum using communication links 125. Communication links 125 may include LTE/LTE-A/LTE-D communications, Bluetooth communications, Wi-Fi communications, M2M communications, or other communications over the licensed or shared frequency spectrum. A wireless modem 135 may be located on a chip that also includes devices and sensors for performing communications in wireless communications system 100. In some examples, the devices and sensors included at the chip may include a Global Navigation Satellite System (GNSS) (e.g., a Global Positioning System (GPS)), an antenna, a motion sensor, an audio sensor, a thermal sensor, a signal analyzer, a Doppler estimator, a history logger, an accelerometer, a processor, and the like. In some case, the Doppler estimator and history logger are implemented at a processor included in the wireless modem 135.

UEs 115, such as a vehicle or package, may be equipped with a wireless modem 135. And in some cases, the wireless modem 135 may be used to notify a dispatcher 140 via a base station 105 and/or core network 130 of a detected collision (e.g., a car crash, package drop, etc.). In some examples, the dispatcher 140 may be located at the base station 105 and may be autonomously triggered to alert the authorities of a collision. In other cases, the dispatcher 140 may be a call center, where humans may field and respond to emergency message reports. In some examples, a collision detection system implemented at a vehicle relies on accelerometer data to trigger emergency message reporting (e.g., signaling an indication of a detected collision). However, in systems with a damaged accelerometer and/or a damaged communication link (e.g., a physical wire connecting the accelerometer with the wireless modem 135), the wireless modem 135 may fail to receive the accelerometer data, which may result in a failure to trigger emergency message reporting.

A wireless modem 135 may, therefore, utilize additional devices and sensors located at the same chip as the wireless modem 135 to trigger emergency message reporting. In one example, the wireless modem 135 may measure a number of signals from the additional devices in the event where a physical link between the wireless modem and the accelerometer is broken or the accelerometer is inoperable, or both. In another example, accelerometer may still function, and the wireless modem 135 may continuously measure a number of signals from the devices located on the same chip as the wireless modem 135 to predict or identify a time period at which a collision event is likely to occur. The wireless modem 135 may use the measured signals at a first time (e.g., 50 ms) before the predicted collision event, and a second time (e.g., 50 ms) after the predicted collision event, to determine whether a collision event has occurred—e.g., by comparing the signals with threshold values, or comparing a rate of change of the signal measurements over the time period (e.g., 100 ms) with a threshold.

After determining that a collision event has occurred the wireless modem 135 may transmit an indication that the collision even has occurred. In some examples, the wireless modem 135 may transmit the indication to a base station 105, which may forward the indication to the dispatcher 140. By utilizing the devices and sensors that are located at the same chip, the wireless modem 135 may mitigate unreliability associated with using devices and sensors that are located off-chip (for instance, in other locations in a vehicle such as an airbag sensor), such as physical wiring, increased sensitivity, susceptibility to shock, etc. Using the existing sensors and devices at the wireless modem 135 may further reduce costs associated with manufacturing and purchasing the wireless modem.

Figure 2:
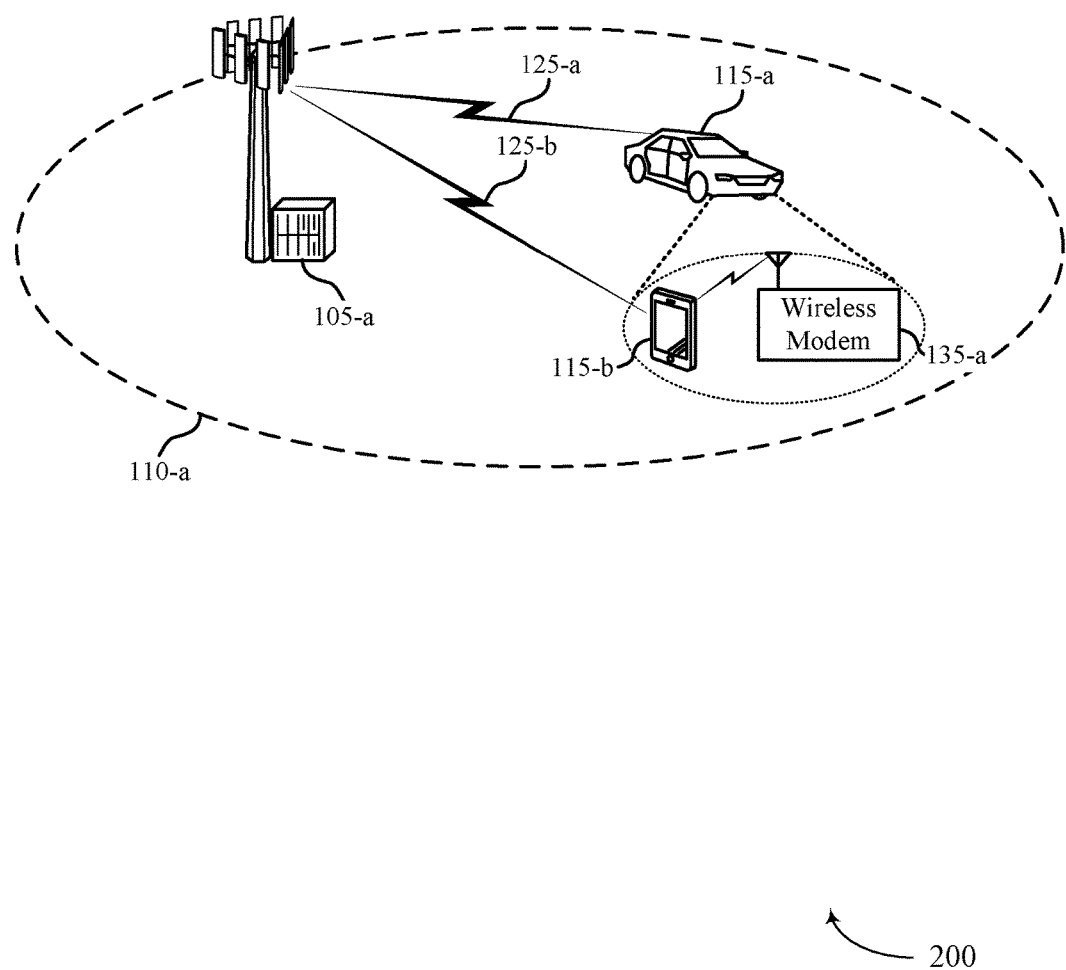
FIG. 2 illustrates an example of a wireless communication subsystem that supports detecting and reporting collision events in accordance with various aspects of the present disclosure.

FIG. 2 illustrates an example of a wireless communications subsystem 200 that supports detecting and reporting collision events in accordance with various aspects of the present disclosure. Wireless communications subsystem 200 may include UE 115-a, UE 115-b, base station 105-a, communication link 125-a, and wireless modem 135-a which may be examples of a UE 115, a base station 105, communication link 125, or a wireless modem 135 and may be used in communications as described above with reference to FIG. 1.

UE 115-a may be a vehicle (e.g., a bicycle, a motorcycle, an automobile) and may include other UEs, such as UE 115-b, which may be a cellular phone, tablet, laptop, etc. UE 115-a may also include a wireless modem 135-a for communicating over dedicated spectrum or shared spectrum, or both. In some examples, UE 115-a may communicate with base station 105-a via wireless modem 135-a or with UE 115-b via wireless modem 135-a. In some examples, UE 115-a may communicate with base station 105-a via UE 115-b. As discussed above, UE 115-a may use wireless modem 135-a for communication purposes, in addition to emergency reporting services.

In the example of FIG. 2, UE 115-a may be involved in a collision event (e.g., a head-on collision, roll-over event, etc.). Prior to or during the collision event, an accelerometer used to trigger the wireless modem 135-a to transmit an indication of the collision event may be damaged or a physical link connecting the accelerometer to the wireless modem 135-a may be damaged, or both. Accordingly, wireless modem 135-a may utilize signals measured from other devices (e.g., the device and sensors discussed above with reference to FIG. 1) that are located on the same chip as the wireless modem 135-a to determine that the collision event will occur or has occurred. Wireless modem 135-a may compare the measured signals with one or more thresholds to determine if the collision event has occurred, as discussed below and in more detail with respect to FIG. 3. In one example, if a signal of the measured signals is greater than a threshold or if a certain combination of the measured signals are greater than their corresponding thresholds, wireless modem 135-a may determine that a collision event has occurred. In some examples, a weighting function may be applied to the measured signals prior to the comparison.

In some examples, wireless modem 135-a may use signals measured at an antenna that are received from nearby wireless devices, such as UE 115-b. For instance, UE 115-b may use its sensors, which may include any of the sensors and devices mentioned above (e.g., an accelerometer), to identify a collision scenario. Upon identifying a collision scenario, UE 115-b may transmit a collision report to wireless modem 135-a including information measured at UE 115-b (e.g., accelerometer data, motion sensor data, Doppler pattern information, history information, audio data, etc.) Wireless modem 135-a may use this information in addition to the signals measured at wireless modem 135-a in determining whether a collision event has occurred.

After determining that a collision event has occurred, wireless modem 135-a may transmit a collision report (e.g., an indication of a collision) to base station 105-a. In some scenarios, the transmission to base station 105-a may fail (e.g., due to damage to an external antenna of UE 115-a, internal antenna of wireless modem 135-a, etc.). In such a scenario, wireless modem 135-a may send the collision report to UE 115-b and trigger UE 115-b to forward the collision report to base station 105-a.

Figure 3:
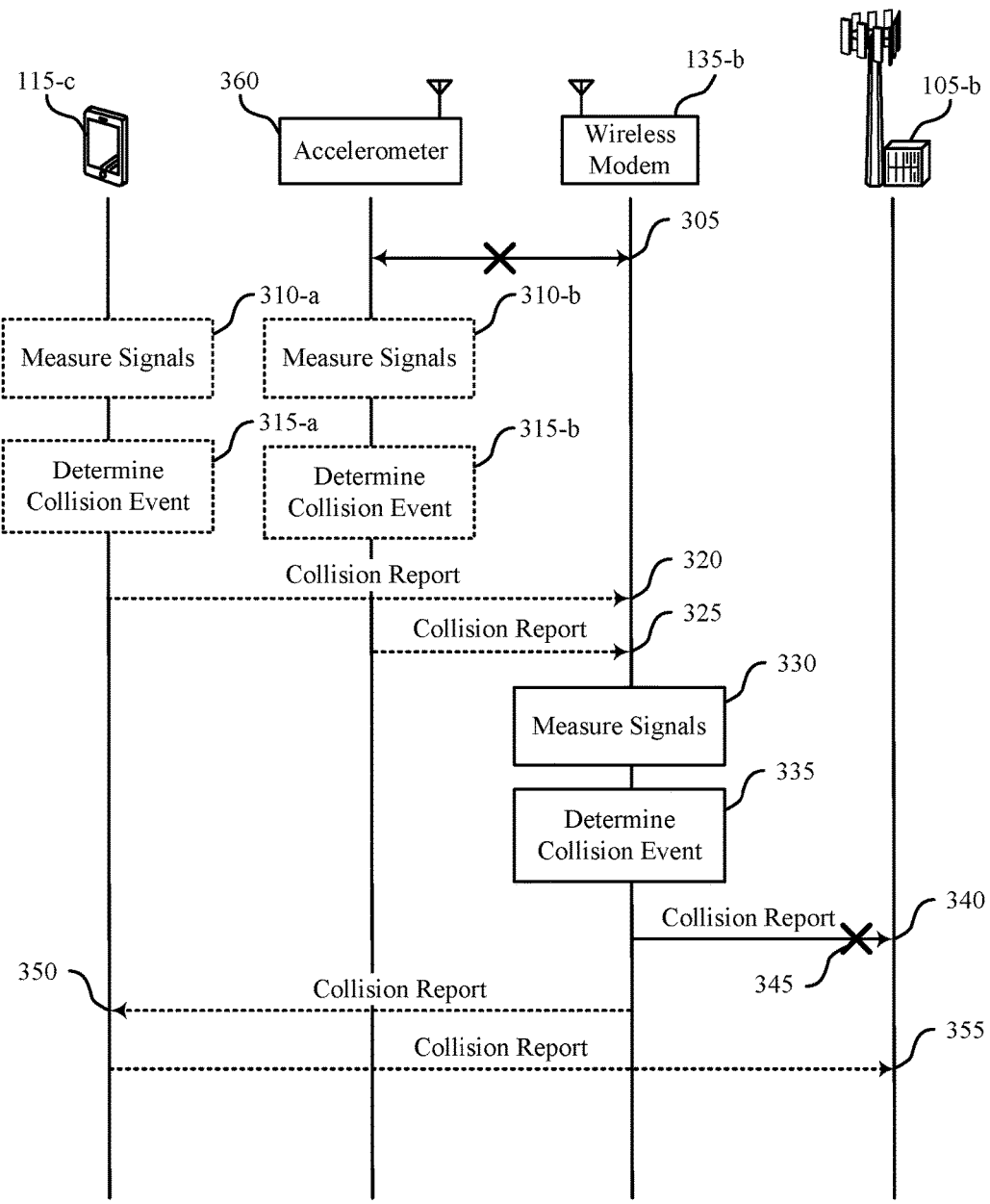
FIG. 3 illustrates an example of a process flow in a system that supports detecting and reporting collision events in accordance with aspects of the present disclosure.

FIG. 3 illustrates an example of a process flow 300 for detecting and reporting collision events in accordance with various aspects of the present disclosure. Process flow 300 may be performed by wireless modem 135-b, UE 115-c, base station 105-b, and accelerometer 360, which may be an example of a UE 115, base station 105, or wireless modem 135-b as described above with reference to FIGS. 1-2. In some examples, wireless modem 135-b may utilize signals measured at the wireless modem, signals received from an accelerometer 360, and/or signals received from a UE 115-c to determine when a collision event has occurred. Wireless modem 135-b may use the determination to trigger the transmission of a collision report to a base station 105-b, which may relay the collision report to a dispatch center.

At step 305, the connection between accelerometer 360 and wireless modem 135-b may be damaged (e.g., due to a crash or collision event). In some cases, the accelerometer may still function, and may measure an acceleration of wireless modem 135-b at step 310-b. Similarly at step 310-a a nearby UE, such as UE 115-c (e.g., a laptop or phone located in a vehicle that is equipped with wireless modem 135-b) may also measure signals (e.g., acceleration, audio, thermal, antenna, in addition to position and Doppler measurements) using its own devices and sensors (e.g., accelerometer, motion sensor, audio sensor, etc.). Wireless device 115-c may use the same collision detection algorithm used by wireless modem 135-b.

At step 315-b the accelerometer may determine a collision event based on the signal measured in step 310-b exceeding a threshold. Similarly, at 315-a wireless device 115-c may also determine that a collision event has occurred. At step 320, wireless device may wirelessly transmit a collision report to wireless modem 135-b, and at step 325 the accelerometer 360 may wirelessly transmit (e.g., due to the wired link damage from step 305) a collision report to wireless modem 135-b. Accelerometer 360 may utilize the shared spectrum for transmitting the collision report, utilizing shared spectrum technologies such as Wi-Fi or Bluetooth.

In some examples, the accelerometer 360 may itself be damaged during the collision event at step 305, and therefore may not detect the collision event at 315-b. Similarly, in some scenarios a nearby UE 115, such as UE 115-c may not be available. At step 330 the wireless modem 135-b may measure signals via at least one of a GNSS, motion sensor, audio sensor, thermal sensor, signal analyzer, Doppler estimator, history logger, or some combination thereof. In some cases, step 330 may occur concurrently with or prior to step 305. Wireless modem 135-b may determine a collision event at step 335. The detection of the collision event may be based on a signal measured in step 330 exceeding a threshold, as further describe below with reference to one or more devices located on the same chip as the wireless modem.

That is, a GNSS may measure unique patterns associated with a sudden stop or crash. The pattern may be detected when the wireless modem 135-b is in the idle or connected mode. The GNSS may measure a velocity drop exceeding a threshold (e.g., over a certain time duration), a deceleration magnitude exceeding a threshold, a displacement in the opposite direction of traffic flow, velocity or acceleration data deviating from routine or normal driving direction, or other abnormal patterns to determine a collision event has occurred.

A motion sensor may measure unique patterns of motion related metrics due to a sudden stop or crash. The pattern may be detected when the wireless modem 135-b is in the idle or connected mode. The motion sensor may determine a crash or collision event when motion sensor measurement patterns (including deceleration magnitude, deceleration direction, motion state, etc.) match the typical patterns during a crash.

A thermal sensor may be implemented in wireless modem 135-b. A crash may lead to a temperature rise in case of a fire accident. Therefore, once the thermal sensor detects an abnormal temperature rise, the wireless modem 135-b may determine a crash or collision event has occurred. The abnormal pattern may be detected when wireless modem 135-b is in idle or connected mode.

An audio sensor may be implemented in wireless modem 135-b, and may measure unique or abnormal sounds generally associated with a crash. The sounds may be detected when the wireless modem 135-b is in the idle or connected mode. The audio sensor may determine a crash or collision event when the parameters of a sound (including magnitude, frequency, etc.) match the typical patterns during a crash.

An antenna may measure a signal pattern that may be distorted or impacted (e.g., high attenuation) during a sudden stop or crash. For example, received signal strengths or received signal patterns may match typical patterns during a collision event and may be used to determine a crash or collision event occurred. In some cases, it may be possible for an external high gain antenna to be detached from the modem resulting in the modem only relying on the regular antenna to operate with. This can be detected by a sudden change on the pilot powers seen. The pilot powers may be detected when the wireless modem 135-b is in the idle or connected mode. Algorithms may disable the offsetting of measurements reported to the network and report actual values in order to determine if a signal pattern is associated with a collision event. This may occur in a region when single radio voice call continuity (SRVCC) is typically triggered in the network and the modem may return to the regular mode of operation when disassociated with the high gain antenna to allow for the UE to reselect a cell or transfer a call to the 3G network like a regular device.

A Doppler estimator may use measured Doppler shift patterns to determine a sudden stop or collision event. Many high Doppler drift peaks may exist during high speed motion while Doppler drift peaks may be absent when a vehicle suddenly stops due to a crash. A decrease in Doppler shifts exceeding a threshold over a certain time period (e.g., 100 milliseconds) may be used to determine a collision event. That is, a collision report may be sent based on a dropping or lack of Doppler peaks.

A history logger may log information in a database related to driving behavior such as normal time, location, and duration of stopping and moving. The database may detect abnormal behavior that does not match typical driving behavior logged in the history information. The history information entity may determine a collision event and trigger the modem to send a collision report. For example, when the modem senses a sudden stop when the device is expected to be moving from one cluster of cells to another, the modem may determine the stop is not typical and may report a collision event.

All of the sensors above may be used alone or in combination to determine a collision event at modem 135-b. In some examples, each of the measured signals above is assigned a weighting value according to a weighting function. The weighting function may be used to assign higher priority to certain signals over others (e.g., a high temperature over a loud noise). Each signal may be compared with a corresponding threshold. In some cases the determination is made when one signal exceeds a thresholds. In other cases the determination is made when a combination of signals each exceed a corresponding thresholds or exceed a combined threshold.

At step 340, wireless modem 135-b may transmit a collision report to base station 105-b. Alternatively, at step 355 UE 115-c may transmit the collision report received in step 350 to base station 105-b. Base station 105-b may then notify the dispatch center of the collision event.

In some scenarios, such as at 345 the wireless modem 135-b may be unable to transmit a collision report. For instance, in the event of a collision an antenna for transmitting may be broken. In some examples, wireless modem 135-b may use the shared spectrum to transmit the collision report to UE 115-c (e.g., using Bluetooth or Wi-Fi.) At 350, the wireless modem 135-b may transmit the collision report to UE 115-c instead, which may trigger UE 115-c to transmit the collision report to base station 105-b. Base station 105-b may then notify the dispatch center of the collision event. In some examples, if UE 115-c is unavailable, wireless modem 135-b may notify nearby vehicles using technologies such as Wi-Fi or Bluetooth to report the collision event.

In some examples, wireless modem 135-b may transmit a reserved emergency code (e.g., emergency prose code) using LTE-D all identified LTE-D channels across multiple operators. Wireless modem 135-b may identify the LTE-D channel by performing a channel scan. LTE-D devices that receive the emergency code may notify a base station, such as base station 105-b or a dispatch center.

Figure 4:
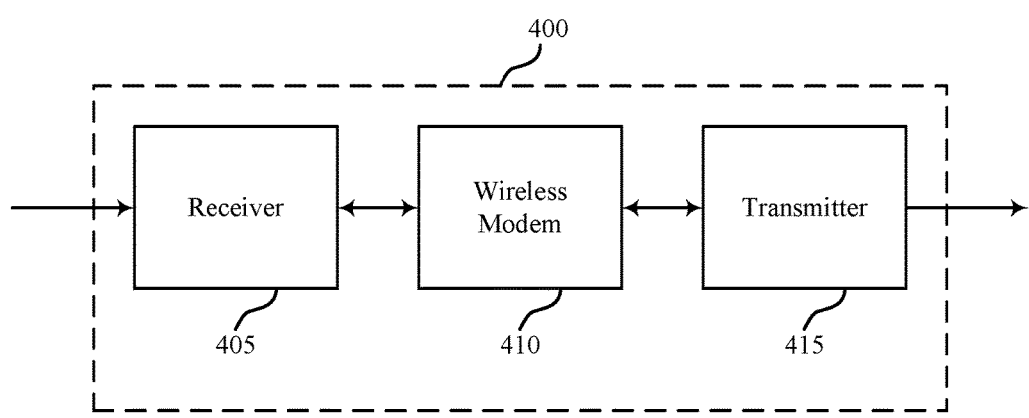
FIGS. 4 through 6 show block diagrams of a wireless device that supports detecting and reporting collision events in accordance with aspects of the present disclosure.

FIG. 4 shows a block diagram of a wireless device 400 that supports detecting and reporting collision events in accordance with various aspects of the present disclosure. Wireless device 400 may be an example of aspects of a UE 115 described with reference to FIGS. 1 and 2. Wireless device 400 may include receiver 405, wireless modem 410 and transmitter 415. Wireless device 400 may also include a processor. Each of these components may be in communication with each other.

The receiver 405 may receive information such as packets, user data, or control information associated with various information channels (e.g., control channels, data channels, and information related to detecting and reporting collision events, etc.). Information may be passed on to other components of the device. The receiver 405 may be an example of aspects of the transceiver 725 described with reference to FIG. 7. In some examples, the receiver 405 is located on the same chip as the wireless modem 410.

The wireless modem 410 may measure, at the wireless modem, a set of signals associated with a corresponding set of devices located on a same chip as the wireless modem, the measuring occurring when a physical link between the wireless modem and an accelerometer is broken, the accelerometer is inoperable, or a combination thereof, determine, at the wireless modem, that a collision event has occurred based on the measured set of signals, and transmit, from the wireless modem, an indication that the collision event has occurred based on the determining. In some other cases, determining that a collision event has occurred, may be based on a comparison between two or more sets of signals measured over a time period (e.g., 100 ms). The wireless modem 410 may also be an example of aspects of the wireless modem 705 described with reference to FIG. 7.

The transmitter 415 may transmit signals received from other components of wireless device 400. In some examples, the transmitter 415 may be collocated with a receiver in a transceiver module. For example, the transmitter 415 may be an example of aspects of the transceiver 725 described with reference to FIG. 7. The transmitter 415 may include a single antenna, or it may include a plurality of antennas. In some examples, the transmitter 415 is located on the same chip as the wireless modem 410 and may be used to transmit the indication that the collision event has occurred based on the determining.

Figure 5:
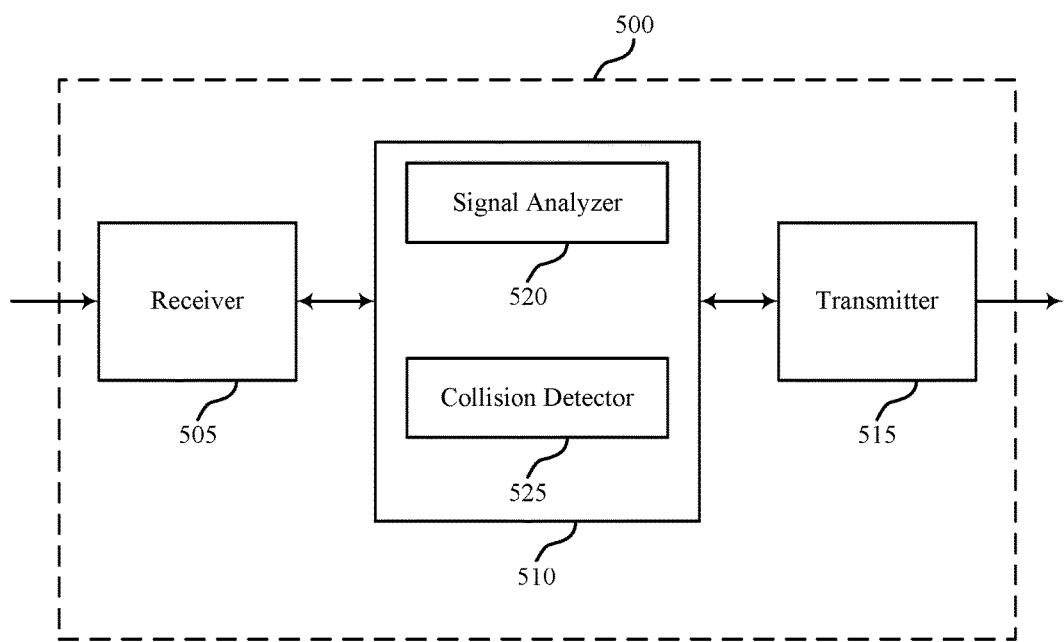

FIG. 5 shows a block diagram of a wireless device 500 that supports detecting and reporting collision events in accordance with various aspects of the present disclosure. Wireless device 500 may be an example of aspects of a wireless device 400 or a UE 115 described with reference to FIGS. 1, 2 and 4. Wireless device 500 may include receiver 505, wireless modem 510 and transmitter 515. Wireless device 500 may also include a processor. Each of these components may be in communication with each other. The wireless modem 510 may be an example of aspects of wireless modem 410 described with reference to FIG. 4. The wireless modem 510 may include signal analyzer 520 and collision detector 525. The wireless modem 510 may be an example of aspects of the wireless modem 705 described with reference to FIG. 7.

The receiver 505 may receive information which may be passed on to other components of the device. The receiver 505 may also perform the functions described with reference to the receiver 405 of FIG. 4. The receiver 505 may be an example of aspects of the transceiver 725 described with reference to FIG. 7. In some examples, the receiver 505 is located on the same chip as the wireless modem 510 and may receive a signal of the set of signals from a wireless device within communication range of the wireless modem, the signal is received via a shared radio frequency spectrum band, and the signal is indicative of a position, a velocity, an acceleration, or a combination thereof, of the wireless device. In some examples, the wireless device 500 may receive, at the wireless modem, a signal of the set of signals from the accelerometer via a wireless link and/or a wired link. In some cases, the signal indicates an acceleration or a deceleration of the wireless modem. In some cases, the receiver 505 may receive, from a dispatcher or dispatch center, a voice call in response to the indication that the collision event has occurred.

The signal analyzer 520 may measure, at the wireless modem, a set of signals associated with a corresponding set of devices located on a same chip as the wireless modem, the measuring occurring when a physical link between the wireless modem and an accelerometer is broken, the accelerometer is inoperable, or a combination thereof. In some cases, the corresponding set of devices comprises the accelerometer, a GNSS, a motion sensor, an audio sensor, a thermal sensor, a reception analyzer, a Doppler estimator, a wireless device, a history logger, or a combination thereof. In some cases, the set of signals indicate: a position of the wireless modem, a direction of the wireless modem, a velocity of the wireless modem, an acceleration or deceleration of the wireless modem, an auditory signal received at the wireless modem, a temperature of the wireless modem, a Doppler pattern identified by the wireless modem, a signal strength of a cellular signal, or a combination thereof.

The collision detector 525 may compare a signal of the set of signals to a threshold, where the determining comprises determining that the signal is greater than the threshold, apply a weighting value to the signal, where the comparing comprises comparing the weighted signal to the threshold, and determine, at the wireless modem, that a collision event has occurred based on the measured set of signals. In some cases, the wireless modem is in an idle mode or a connected mode prior to the determining.

The transmitter 515 may transmit an emergency prose code on the available channel, transmit, to a dispatcher, a voice call based on the determining that the collision event has occurred, and transmit, from the wireless modem, an indication that the collision event has occurred based on the determining. In some cases, the transmitting includes transmitting the indication that the collision event has occurred to a wireless device within communication range of the wireless modem via a shared radio frequency spectrum band. In some cases, the indication is transmitted to a dispatcher through the wireless device. In some cases, the transmitting includes scanning for an available channel in a shared radio frequency spectrum band.

Figure 6:
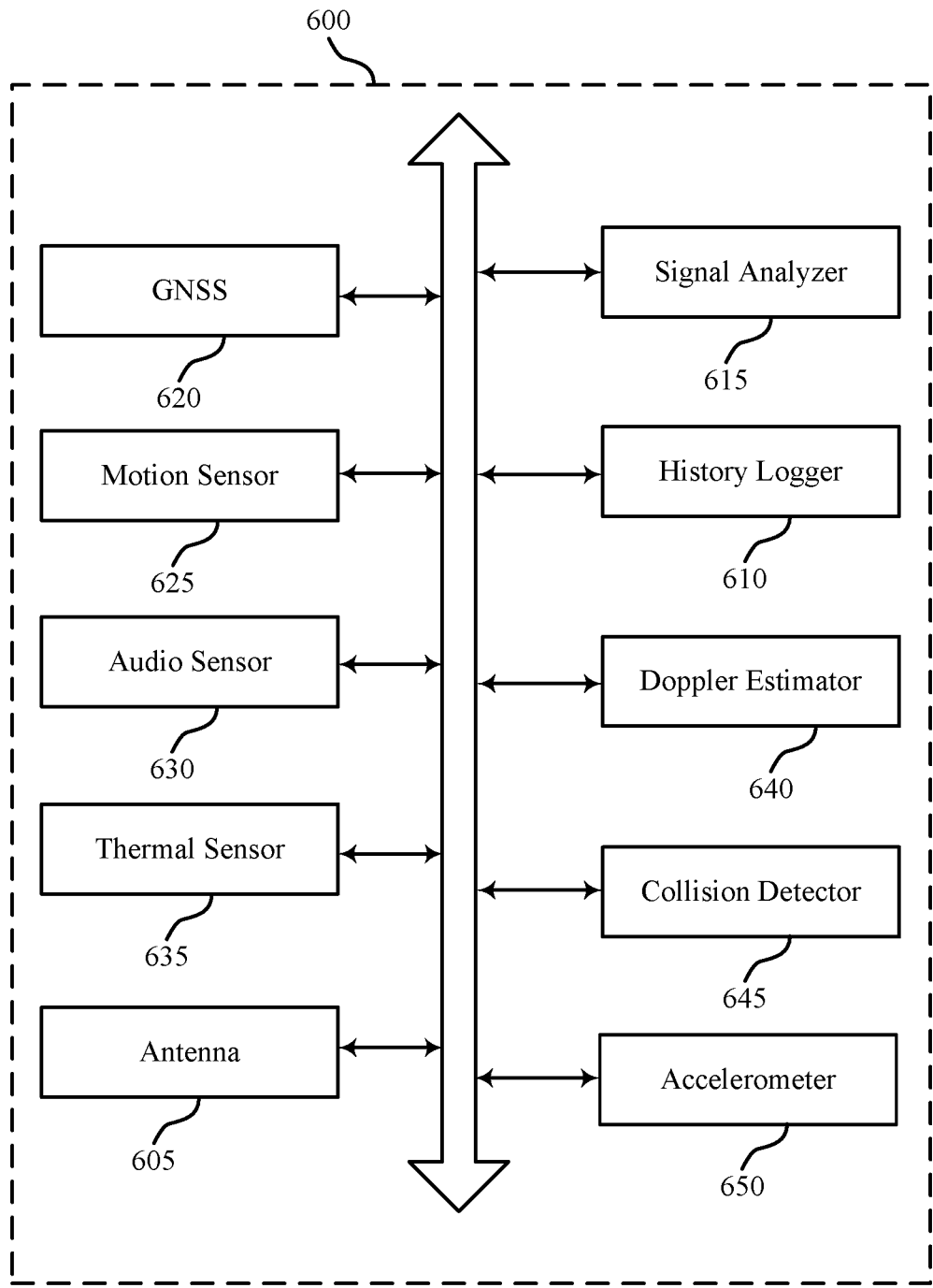

FIG. 6 shows a block diagram of a wireless modem 600 which may be an example of the corresponding component of wireless device 400 or wireless device 500. That is, wireless modem 600 may be an example of aspects of wireless modem 410 or wireless modem 510 described with reference to FIGS. 4 and 5. The wireless modem 600 may also be an example of aspects of the wireless modem 705 described with reference to FIG. 7.

The wireless modem 600 may include antenna 605, history logger 610, signal analyzer 615, GNSS 620, motion sensor 625, audio sensor 630, thermal sensor, 635, Doppler estimator 640, collision detector 645, and accelerometer 650. Each of these modules may communicate, directly or indirectly, with one another (e.g., via one or more buses).

The antenna 605 may receive, at the wireless modem 600, a signal from a wireless device within communication range of the wireless modem 600 via a shared radio frequency spectrum band. The signal may be indicative of a position, a velocity, an acceleration, or a combination thereof, of the wireless device. In some cases, the antenna 605 may receive, at the wireless modem, a signal from the accelerometer 650 via a wireless link and/or a wired link. In some cases, the signal indicates an acceleration or a deceleration of the wireless modem. Antenna 605 may be coupled with receivers 405 and 505 as described with reference to FIGS. 4 and 5.

The history logger 610 may maintain, at the wireless modem 600, a history of a movement of the wireless modem 600, where the determining comprises determining that a present movement of the wireless modem 600 is inconsistent with the history of the movement.

The signal analyzer 615 may measure, at the wireless modem 600, a set of signals associated with a corresponding set of devices located on a same chip as the wireless modem, the measuring occurring when a physical link between the wireless modem and the accelerometer 650 is broken, the accelerometer 650 is inoperable, or a combination thereof. In some other cases, the accelerometer 650 may be functioning, and the signal analyzer 615 may continuously measure, at the wireless modem 600, a set of signals associated with the corresponding set of devices located on the same chip as the wireless modem. In some cases, the corresponding set of devices comprises the accelerometer, a GNSS, a motion sensor, an audio sensor, a thermal sensor, a reception analyzer, a Doppler estimator, a wireless device, a history logger, or a combination thereof. In some cases, the set of signals indicate: a position of the wireless modem 600, a direction of the wireless modem 600, a velocity of the wireless modem 600, an acceleration or deceleration of the wireless modem 600, an auditory signal received at the wireless modem 600, a temperature of the wireless modem 600, a Doppler pattern identified by the wireless modem 600, a signal strength of a cellular signal, or a combination thereof.

The collision detector 645 may compare a signal of the set of signals to a threshold, where the determining comprises determining that the signal is greater than the threshold, apply a weighting value to the signal, wherein the comparing comprises comparing the weighted signal to the threshold, and determine, at the wireless modem, that a collision event has occurred based on the measured set of signals. In some cases, the wireless modem is in an idle mode or a connected mode prior to the determining.

Figure 7:
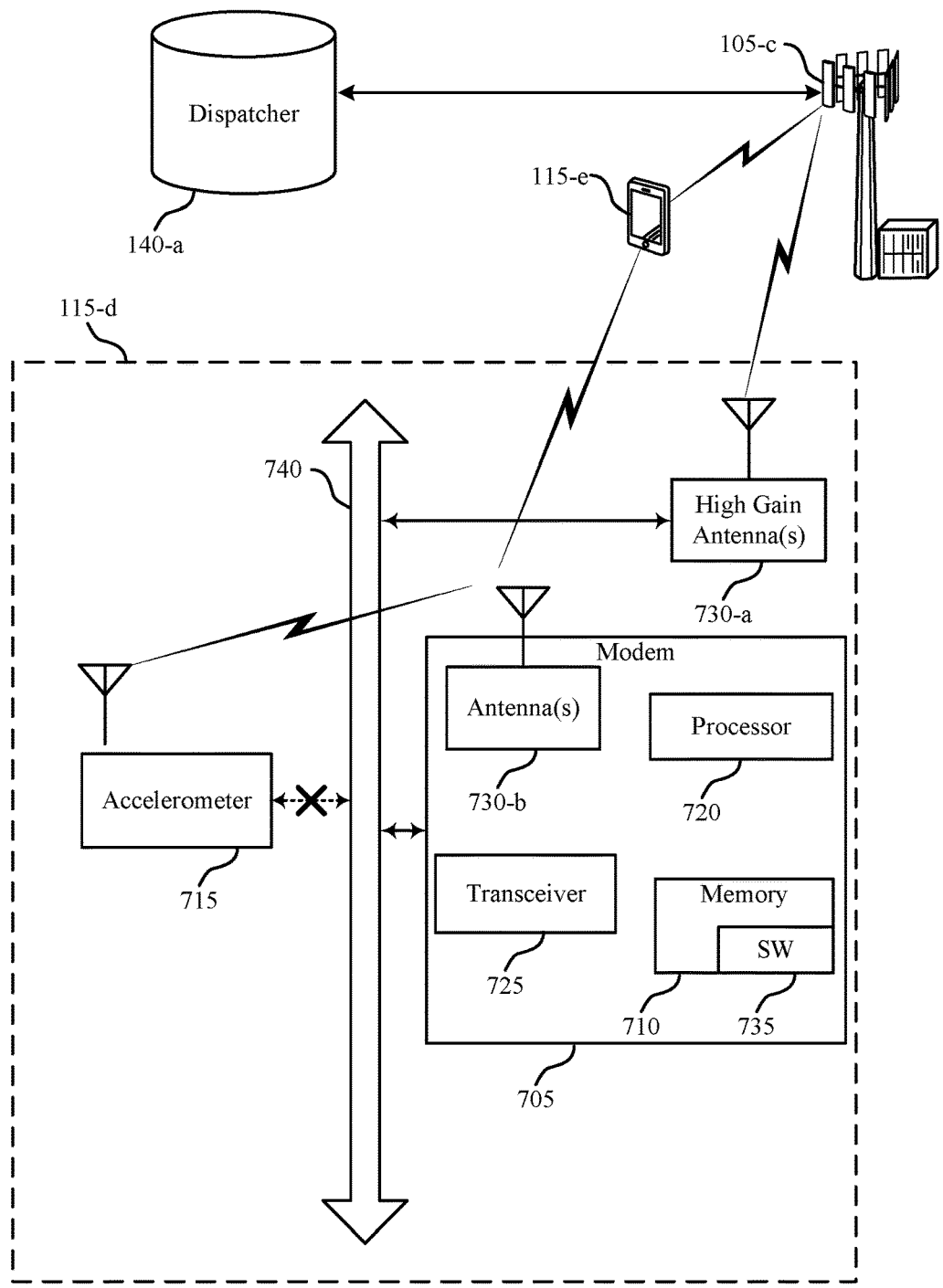
FIG. 7 illustrates a block diagram of a system including a UE that supports detecting and reporting collision events in accordance with aspects of the present disclosure.

FIG. 7 shows a diagram of a system 700 including a device that supports detecting and reporting collision events in accordance with various aspects of the present disclosure. For example, system 700 may include UE 115-*d*, which may be an example of a wireless device 400, a wireless device 500, or a UE 115 as described with reference to FIGS. 1, 2 and 4 through 6.

UE 115-*d* may also include wireless modem 705, memory 710, accelerometer 715, processor 720, transceiver 725, antenna(s) 730-*a* and 730-*b*, and bus 740. Each of these modules may communicate, directly or indirectly, with one another (e.g., via one or more buses). The wireless modem 705 may be an example of a wireless modem as described with reference to FIGS. 4 through 6.

The memory 710 may include random access memory (RAM) and read only memory (ROM). The memory 710 may store computer-readable, computer-executable software including instructions that, when executed, cause the processor to perform various functions described herein (e.g., detecting and reporting collision events, etc.). In some cases, the software 735 may not be directly executable by the processor but may cause a computer (e.g., when compiled and executed) to perform functions described herein. The processor 720 may include an intelligent hardware device, (e.g., a central processing unit (CPU), a microcontroller, an application specific integrated circuit (ASIC), etc.)

The transceiver 725 may communicate bi-directionally, via one or more antennas, wired, or wireless links, with one or more networks, as described above. For example, the transceiver 725 may communicate bi-directionally with a base station 105 or a UE 115. The transceiver 725 may also include a modem to modulate the packets and provide the modulated packets to the antennas for transmission, and to demodulate packets received from the antennas. In some cases, the wireless device may include a single antenna 730. However, in some cases the device may have more than one antenna 730, such as high gain antenna 730-*a* and antenna 730-*b*, which may be capable of concurrently transmitting or receiving multiple wireless transmissions or capable of transmissions of different distances.

Figure 8:
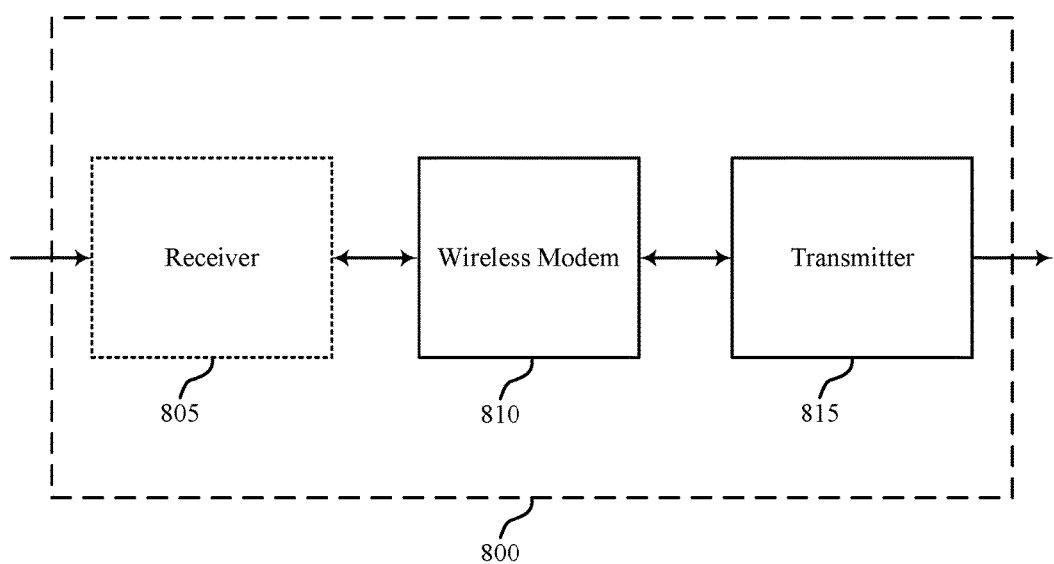
FIGS. 8 through 10 show block diagrams of a wireless device that supports detecting and reporting collision events in accordance with aspects of the present disclosure.

FIG. 8 shows a block diagram of a wireless device 800 that supports detecting and reporting collision events in accordance with various aspects of the present disclosure. Wireless device 800 may be an example of aspects of a UE 115 described with reference to FIGS. 1 and 2. Wireless device 800 may include receiver 805, wireless modem 810 and transmitter 815. Wireless device 800 may also include a processor. Each of these components may be in communication with each other.

The receiver 805 may receive information such as packets, user data, or control information associated with various information channels (e.g., control channels, data channels, and information related to detecting and reporting collision events, etc.). Information may be passed on to other components of the device. The receiver 805 may be an example of aspects of the transceiver 1125 described with reference to FIG. 11. In some examples the receiver 805 may optionally be implemented.

The wireless modem 810 may measure, at the wireless modem, a signal received from a motion sensor, where the wireless modem and the motion sensor are located on a same chip and coupled with a delivery package, determine, at the wireless modem, that a collision event has occurred based on the measured signal, and transmit, from the wireless modem to a distributor, an indication that the collision event has occurred based on the determining. The wireless modem 810 may also be an example of aspects of the wireless modem 1105 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. The transmitter 815 may include a single antenna, or it may include a plurality of antennas. In some examples, the transmitter may be located on the same chip as the wireless modem 810 and may be used to transmit the indication that the collision event has occurred based on the determining.

Figure 9:
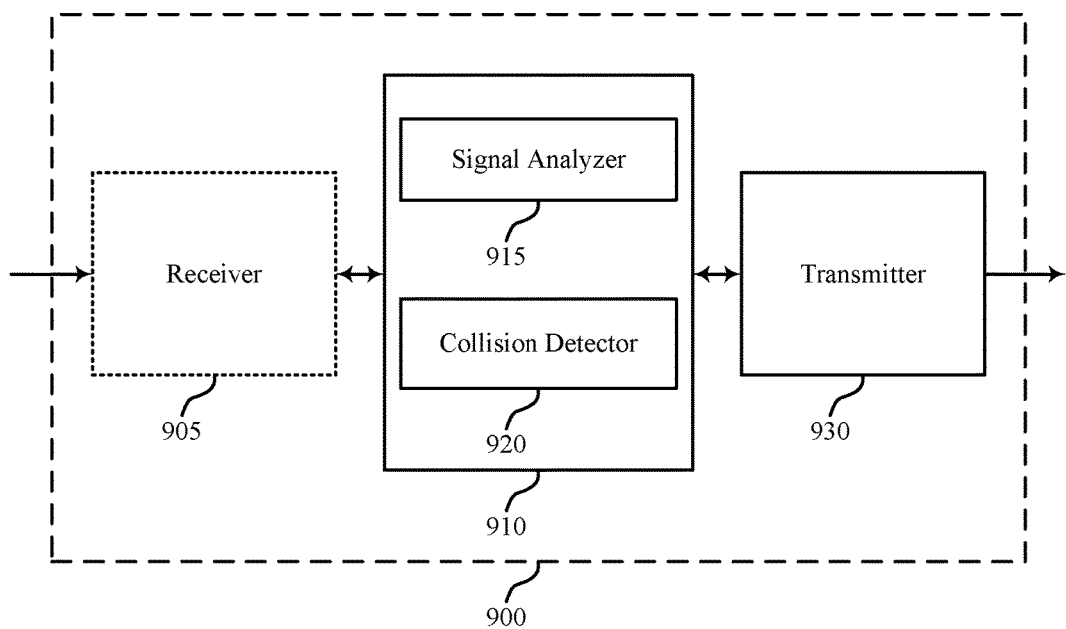

FIG. 9 shows a block diagram of a wireless device 900 that supports detecting and reporting collision events in accordance with various aspects of the present disclosure. Wireless device 900 may be an example of aspects of a wireless device 800 or a UE 115 described with reference to FIGS. 1, 2 and 8. Wireless device 900 may include receiver 905, wireless modem 910 and transmitter 930. Wireless device 900 may also include a processor. Each of these components may be in communication with each other. In some examples, wireless device 900 is incorporated into a delivery package.

The wireless modem 910 may be an example of aspects of wireless modem 810 described with reference to FIG. 8. The wireless modem 910 may include signal analyzer 915 and collision detector 920. The wireless modem 910 may be an example of aspects of the wireless modem 1105 described with reference to FIG. 11.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11. In some examples the receiver 905 may optionally be implemented.

The signal analyzer 915 may measure, at the wireless modem, a signal received from a motion sensor, where the wireless modem and the motion sensor are located on a same chip and coupled with a delivery package. In some cases, the signal indicates: a position of the wireless modem, a direction of the wireless modem, a velocity of the wireless modem, an acceleration or deceleration of the wireless modem, or a combination thereof. In some cases, the wireless modem and the motion sensor are attached to the delivery package, placed within the delivery package, or a combination thereof. Signal analyzer 915 may identify abrupt changes in direction or velocity that are indicative of a collision event for a delivery package. The collision detector 920 may determine, at the wireless modem, that a collision event has occurred based on the measured signal.

The transmitter 930 may transmit signals received from other components of wireless device 900. In some examples, the transmitter 930 may be collocated with a receiver in a transceiver module. For example, the transmitter 930 may be an example of aspects of the transceiver 1125 described with reference to FIG. 11. The transmitter 930 may utilize a single antenna, or it may utilize a plurality of antennas. The transmitter 930 may transmit, from the wireless modem to a distributor, an indication that the collision event has occurred based on the determining. The indication may include information such as the location of the package, time of collision, etc. The distributor may use this information to determine where and when a collision event occurred and may log the collision event for later reference.

Figure 10:
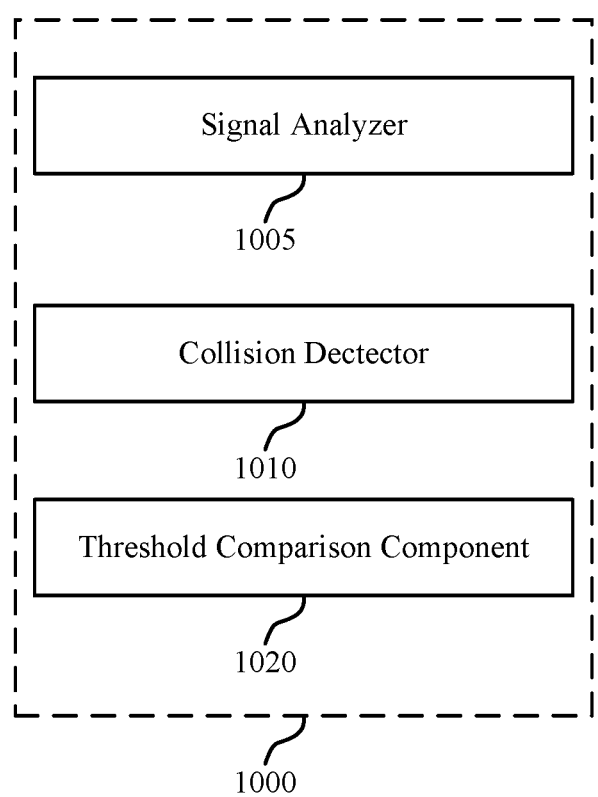

FIG. 10 shows a block diagram of a wireless modem 1000 which may be an example of the corresponding component of wireless device 800 or wireless device 900. That is, wireless modem 1000 may be an example of aspects of wireless modem 810 or wireless modem 910 described with reference to FIGS. 8 and 9. The wireless modem 1000 may also be an example of aspects of the wireless modem 1105 described with reference to FIG. 11.

The wireless modem 1000 may include signal analyzer 1005, collision detector 1010, transmitter 1015 and threshold comparison component 1020. Each of these modules may communicate, directly or indirectly, with one another (e.g., via one or more buses).

The signal analyzer 1005 may measure, at the wireless modem, a signal received from a motion sensor, where the wireless modem and the motion sensor are located on a same chip and coupled with a delivery package. In some cases, the signal indicates: a position of the wireless modem, a direction of the wireless modem, a velocity of the wireless modem, an acceleration or deceleration of the wireless modem, or a combination thereof. In some cases, the wireless modem and the motion sensor are attached to the delivery package, placed within the delivery package, or a combination thereof.

The collision detector 1010 may determine, at the wireless modem, that a collision event has occurred based on the measured signal. The threshold comparison component 1020 may compare the signal to a threshold, where the determining comprises determining that the signal is greater than the threshold.

Figure 11:
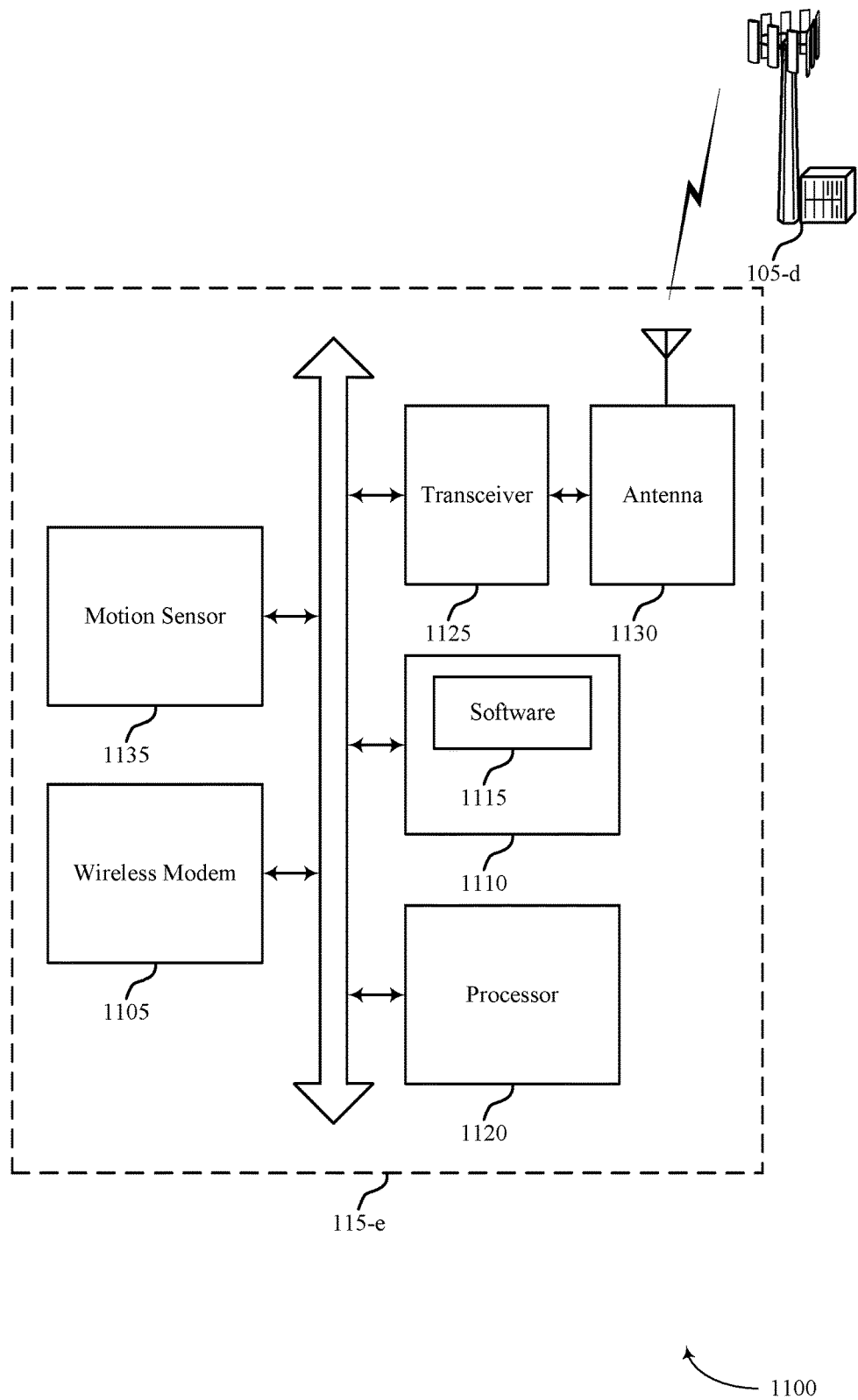
FIG. 11 illustrates a block diagram of a system including a UE that supports detecting and reporting collision events in accordance with aspects of the present disclosure.

FIG. 11 shows a diagram of a system 1100 including a device that supports detecting and reporting collision events in accordance with various aspects of the present disclosure. For example, system 1100 may include UE 115-e, which may be an example of a wireless device 800, a wireless device 900, or a UE 115 as described with reference to FIGS. 1, 2 and 8 through 10.

UE 115-e may also include wireless modem 1105, memory 1110, processor 1120, transceiver 1125, antenna 1130, and motion sensor 1135. Each of these modules may communicate, directly or indirectly, with one another (e.g., via one or more buses). The wireless modem 1105 may be an example of a wireless modem as described with reference to FIGS. 8 through 10.

The memory 1110 may include RAM and ROM. The memory 1110 may store computer-readable, computer-executable software including instructions that, when executed, cause the processor to perform various functions described herein (e.g., detecting and reporting collision events, etc.). In some cases, the software 1115 may not be directly executable by the processor but may cause a computer (e.g., when compiled and executed) to perform functions described herein. The processor 1120 may include an intelligent hardware device, (e.g., a CPU, a microcontroller, an ASIC, etc.)

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 730, which may be capable of concurrently transmitting or receiving multiple wireless transmissions.

Figure 12:
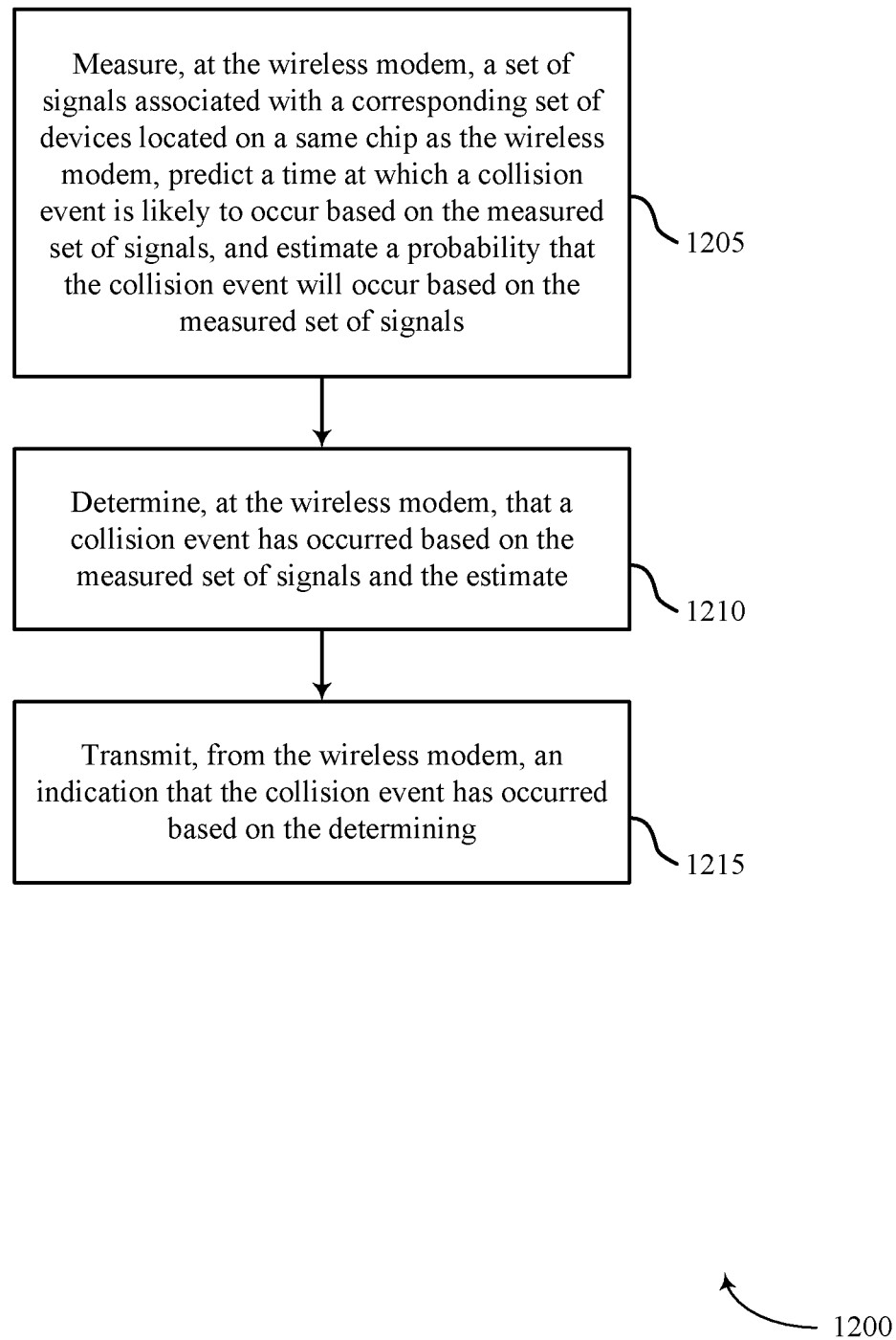
FIGS. 12 through 15 illustrate methods for detecting and reporting collision events in accordance with aspects of the present disclosure.

FIG. 12 shows a flowchart illustrating a method 1200 for detecting and reporting collision events in accordance with various aspects of the present disclosure. The operations of method 1200 may be implemented by a device such as a UE 115 or its components as described with reference to FIGS. 1 and 2. For example, the operations of method 1200 may be performed by the wireless modem as described herein. In some examples, the UE 115 may execute a set of codes to control the functional elements of the device to perform the functions described below. Additionally or alternatively, the UE 115 may perform aspects of the functions described below using special-purpose hardware.

At block 1205, the UE 115 may measure, at the wireless modem, a set of signals associated with a corresponding set of devices located on a same chip as the wireless modem, predict a time at which a collision event is likely to occur based on the measured set of signals, and estimate a probability that the collision event will occur based on the measured set of signals. In some cases, the measuring may occur when a physical link between the wireless modem and an accelerometer is broken, the accelerometer is inoperable, or a combination thereof as described above with reference to FIGS. 2 through 3. In certain examples, the operations of block 1205 may be performed by the signal analyzer as described with reference to FIGS. 5 and 6.

At block 1210, the UE 115 may determine, at the wireless modem, that a collision event has occurred based on the measured set of signals as described above with reference to FIGS. 2 through 3. In certain examples, the operations of block 1210 may be performed by the collision detector as described with reference to FIGS. 5 and 6.

At block 1215, the UE 115 may transmit, from the wireless modem, an indication that the collision event has occurred based on the determining as described above with reference to FIGS. 2 through 3. In certain examples, the operations of block 1215 may be performed by the transmitter as described with reference to FIGS. 5 and 6.

Figure 13:
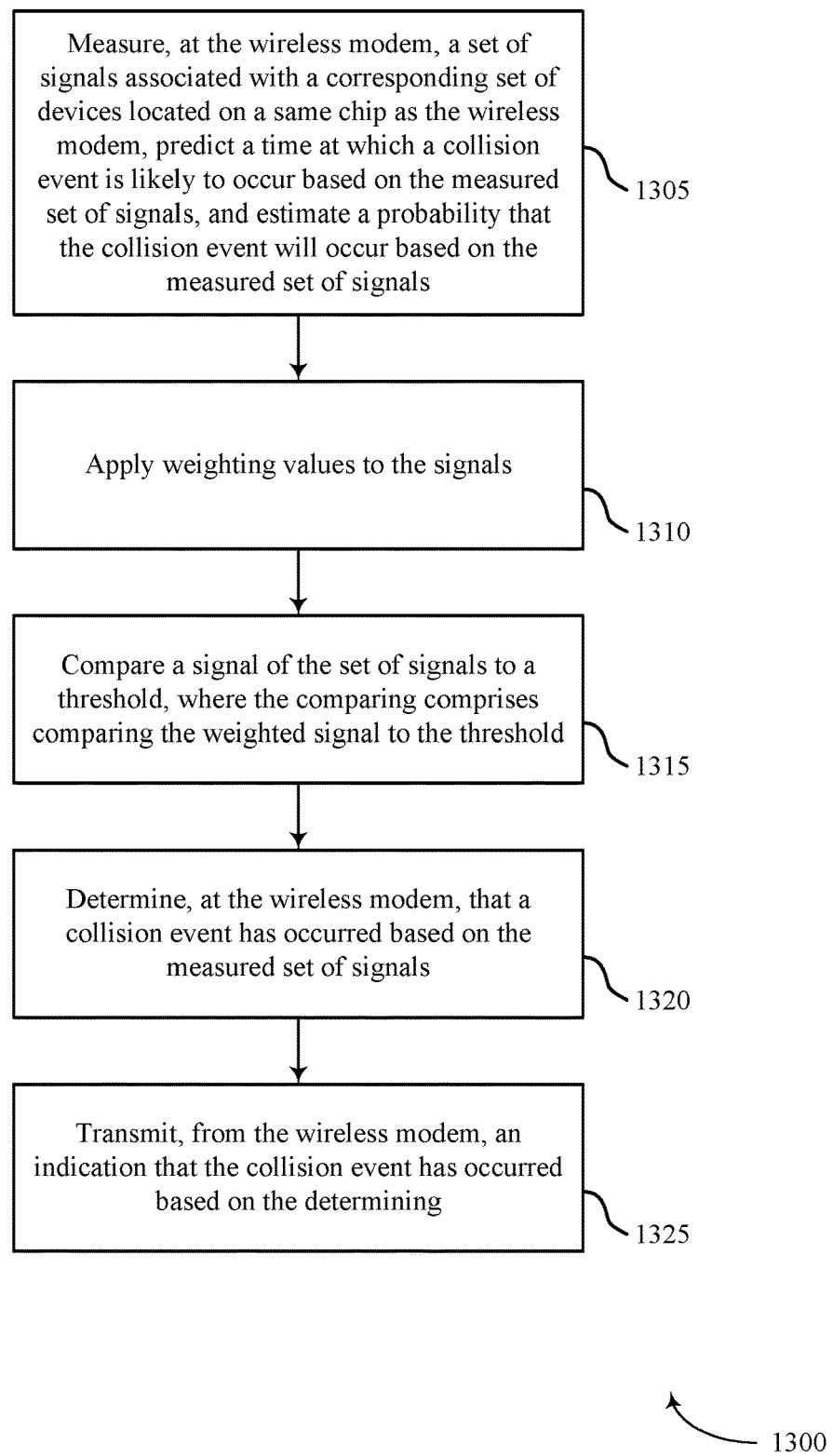

FIG. 13 shows a flowchart illustrating a method 1300 for detecting and reporting collision events in accordance with various aspects of the present disclosure. The operations of method 1300 may be implemented by a device such as a UE 115 or its components as described with reference to FIGS. 1 and 2. For example, the operations of method 1300 may be performed by the wireless modem as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may measure, at the wireless modem, a set of signals associated with a corresponding set of devices located on a same chip as the wireless modem, predict a time at which a collision event is likely to occur based on the measured set of signals, and estimate a probability that the collision event will occur based on the measured set of signals. In some cases, the measuring may occur when a physical link between the wireless modem and an accelerometer is broken, the accelerometer is inoperable, or a combination thereof as described above with reference to FIGS. 2 through 3. In certain examples, the operations of block 1305 may be performed by the signal analyzer as described with reference to FIGS. 5 and 6.

At block 1310, the UE 115 may apply weighting values to the signals as described above with reference to FIGS. 2 through 3. In certain examples, the operations of block 1310 may be performed by the signal analyzer or collision detector as described with reference to FIGS. 5 and 6.

At block 1315, the UE 115 may compare a signal of the set of signals to a threshold, where the comparing comprises comparing the weighted signal to the threshold as described above with reference to FIGS. 2 through 3. In certain examples, the operations of block 1315 may be performed by the collision detector as described with reference to FIGS. 5 and 6.

At block 1320, the UE 115 may determine, at the wireless modem, that a collision event has occurred based on the measured set of signals as described above with reference to FIGS. 2 through 3. In some cases, the determining comprises determining that the signal is greater than the threshold. In certain examples, the operations of block 1320 may be performed by the collision detector as described with reference to FIGS. 5 and 6.

At block 1325, the UE 115 may transmit, from the wireless modem, an indication that the collision event has occurred based on the determining as described above with reference to FIGS. 2 through 3. In certain examples, the operations of block 1325 may be performed by the transmitter as described with reference to FIGS. 5 and 6.

Figure 14:
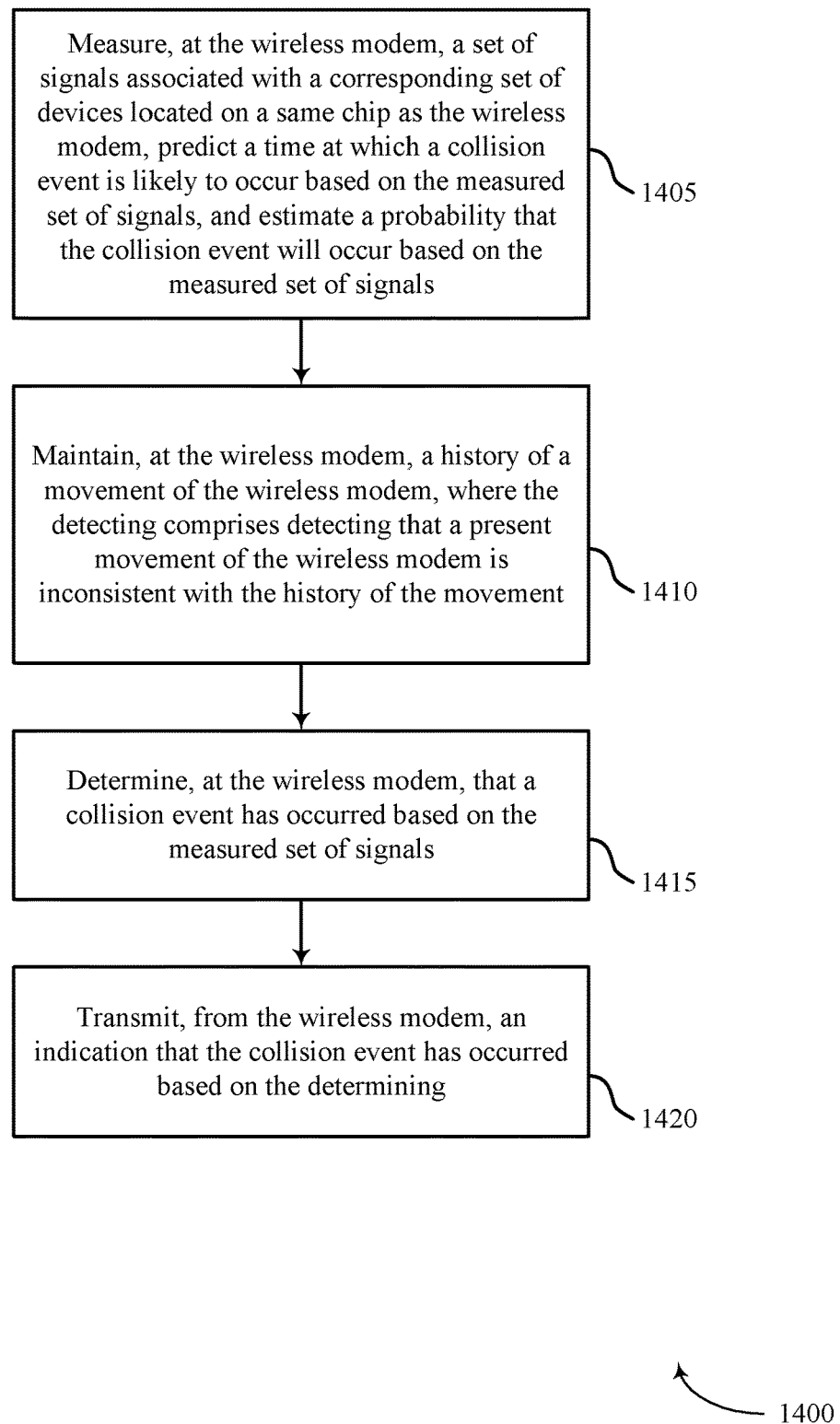

FIG. 14 shows a flowchart illustrating a method 1400 for detecting and reporting collision events in accordance with various aspects of the present disclosure. The operations of method 1400 may be implemented by a device such as a UE 115 or its components as described with reference to FIGS. 1 and 2. For example, the operations of method 1400 may be performed by the wireless modem as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may measure, at the wireless modem, a set of signals associated with a corresponding set of devices located on a same chip as the wireless modem, predict a time at which a collision event is likely to occur based on the measured set of signals, and estimate a probability that the collision event will occur based on the measured set of signals. In some cases, the measuring may occur when a physical link between the wireless modem and an accelerometer is broken, the accelerometer is inoperable, or a combination thereof as described above with reference to FIGS. 2 through 3. In certain examples, the operations of block 1405 may be performed by the signal analyzer as described with reference to FIGS. 5 and 6.

At block 1410, the UE 115 may maintain, at the wireless modem, a history of a movement of the wireless modem, where the determining comprises determining that a present movement of the wireless modem is inconsistent with the history of the movement as described above with reference to FIGS. 2 through 3. In certain examples, the operations of block 1410 may be performed by the history logger as described with reference to FIGS. 5 and 6.

At block 1415, the UE 115 may determine, at the wireless modem, that a collision event has occurred based on the measured set of signals as described above with reference to FIGS. 2 through 3. In certain examples, the operations of block 1415 may be performed by the collision detector as described with reference to FIGS. 5 and 6.

At block 1420, the UE 115 may transmit, from the wireless modem, an indication that the collision event has occurred based on the determining as described above with reference to FIGS. 2 through 3. In certain examples, the operations of block 1420 may be performed by the transmitter as described with reference to FIGS. 5 and 6.

Figure 15:
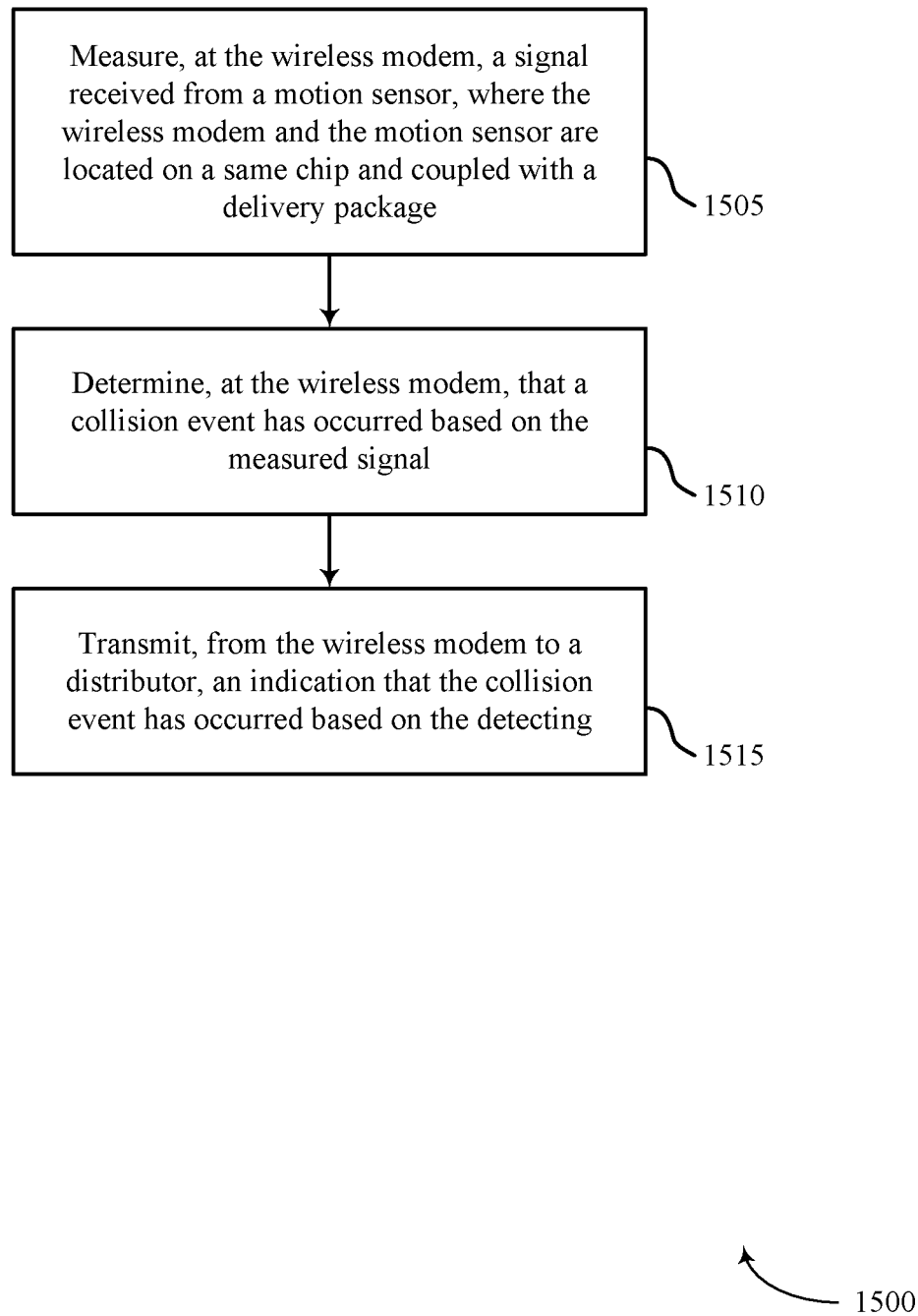

FIG. 15 shows a flowchart illustrating a method 1500 for detecting and reporting collision events in accordance with various aspects of the present disclosure. The operations of method 1500 may be implemented by a device such as a UE 115 or its components as described with reference to FIGS. 1 and 2. For example, the operations of method 1500 may be performed by the wireless modem as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may measure, at the wireless modem, a signal received from a motion sensor, where the wireless modem and the motion sensor are located on a same chip and coupled with a delivery package as described above with reference to FIGS. 2 through 3. In certain examples, the operations of block 1505 may be performed by the signal analyzer as described with reference to FIGS. 5 and 6.

At block 1510, the UE 115 may determine, at the wireless modem, that a collision event has occurred based on the measured signal as described above with reference to FIGS. 2 through 3. In certain examples, the operations of block 1510 may be performed by the collision detector as described with reference to FIGS. 5 and 6.

At block 1515, the UE 115 may transmit, from the wireless modem to a distributor, an indication that the collision event has occurred based on the determining as described above with reference to FIGS. 2 through 3. In certain examples, the operations of block 1515 may be performed by the transmitter as described with reference to FIGS. 5 and 6.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for detecting and reporting collision events.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for detecting and reporting collision events. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a wireless modem, comprising:

measuring, at the wireless modem, a plurality of signals associated with a corresponding plurality of devices located on a same chip as the wireless modem;

predicting, at the wireless modem, a period of time at which a collision event can occur based at least in part on the measured plurality of signals;

estimating, at the wireless modem, a probability that a collision event will occur at the predicted period of time, based at least in part on the measured plurality of signals;

determining, at the wireless modem, that the collision event has occurred based at least in part on the measured plurality of signals and estimation;

transmitting, from the wireless modem, an indication that the collision event has occurred based at least in part on the determining.

2. The method of claim 1, wherein the measuring occurs when a physical link between the wireless modem and an accelerometer is broken, the accelerometer is inoperable, or a combination thereof.

3. The method of claim 1, wherein the determining that the collision event has occurred is based at least in part on a first set of the plurality of signals measured at a first time before the predicted collision event and a second set of the plurality of signals measured at a second time after the predicted collision event.

4. The method of claim 2, further comprising:
receiving, at the wireless modem, a signal of the plurality of signals from the accelerometer via a wireless link or a wired link.

5. The method of claim 4, wherein the signal indicates an acceleration or a deceleration of the wireless modem.

6. The method of claim 1, further comprising:
receiving, at the wireless modem, a signal of the plurality of signals from a wireless device within communication range of the wireless modem, the signal is received via a shared radio frequency spectrum band, and the signal is indicative of a position, a velocity, an acceleration, or a combination thereof, of the wireless device.

7. The method of claim 1, wherein the transmitting comprises:
transmitting the indication that the collision event has occurred to a wireless device within communication range of the wireless modem via a shared radio frequency spectrum band.

8. The method of claim 7, wherein the indication is transmitted to a dispatcher through the wireless device.

9. The method of claim 1, wherein the transmitting comprises:
scanning for an available channel in a shared radio frequency spectrum band; and
transmitting an emergency prose code on the available channel.

10. The method of claim 1, further comprising:
comparing a signal of the plurality of signals to a threshold, wherein the determining comprises determining that the signal is greater than the threshold.

11. The method of claim 10, further comprising:
applying a weighting value to the signal, wherein the comparing comprises comparing the weighted signal to the threshold.

12. The method of claim 1, wherein the wireless modem is in an idle mode or a connected mode prior to the determining.

13. The method of claim 1, further comprising:
maintaining, at the wireless modem, a history of a movement of the wireless modem, wherein the determining comprises determining that a present movement of the wireless modem is inconsistent with the history of the movement.

14. The method of claim 1, wherein the corresponding plurality of devices comprises an accelerometer, a global navigation satellite system (GNSS), a motion sensor, an audio sensor, a thermal sensor, a reception analyzer, a Doppler estimator, a wireless device, a history logger, or a combination thereof.

15. The method of claim 1, wherein the plurality of signals indicate:
a position of the wireless modem, a direction of the wireless modem, a velocity of the wireless modem, an acceleration or deceleration of the wireless modem, an auditory signal received at the wireless modem, a temperature of the wireless modem, a Doppler pattern identified by the wireless modem, a signal strength of a cellular signal, or a combination thereof.

16. The method of claim 1, further comprising:
receiving, from a dispatcher, a voice call in response to the indication that the collision event has occurred.

17. The method of claim 1, further comprising:
transmitting, to a dispatcher, a voice call based at least in part on the determining that the collision event has occurred.

18. A method of wireless communication at a wireless modem, comprising:
measuring, at the wireless modem, a signal received from a motion sensor, wherein the wireless modem and the motion sensor are located on a same chip and coupled with a delivery package;
determining, at the wireless modem, that a collision event has occurred based at least in part on the measured signal; and
transmitting, from the wireless modem to a distributor, an indication that the collision event has occurred based at least in part on the determining.

19. The method of claim 18, further comprising:
comparing the signal to a threshold, wherein the determining comprises determining that the signal is greater than the threshold.

20. The method of claim 18, wherein the signal indicates:
a position of the wireless modem, a direction of the wireless modem, a velocity of the wireless modem, an acceleration or deceleration of the wireless modem, or a combination thereof.

21. The method of claim 18, wherein the wireless modem and the motion sensor are attached to the delivery package, placed within the delivery package, or a combination thereof.

22. An apparatus for wireless communication at a wireless modem, comprising:
a processor;
memory in electronic communication with the processor; and
instructions stored in the memory and operable, when executed by the processor, to cause the apparatus to:
measure, at the wireless modem, a plurality of signals associated with a corresponding plurality of devices located on a same chip as the wireless modem;
predict, at the wireless modem, a period of time at which a collision event can occur based at least in part on the measured plurality of signals;
estimate, at the wireless modem, a probability that a collision event will occur at the predicted period of time, based at least in part on the measured plurality of signals;
determine, at the wireless modem, that a collision event has occurred based at least in part on the measured plurality of signals and estimation; and
transmit, from the wireless modem, an indication that the collision event has occurred based at least in part on the determining.

23. The apparatus of claim 22 wherein the measuring occurs when a physical link between the wireless modem and an accelerometer is broken, the accelerometer is inoperable, or a combination thereof.

24. The apparatus of claim 22 wherein the determining that the collision event has occurred is based at least in part on a first set of the plurality of signals measured at a first time before the predicted collision event and a second set of the plurality of signals measured at a second time after the predicted collision event.

25. The apparatus of claim 23, wherein the instructions are operable to cause the processor to:
receive, at the wireless modem, a signal of the plurality of signals from the accelerometer via a wireless link or a wired link.

26. The apparatus of claim 25, wherein the signal indicates an acceleration or a deceleration of the wireless modem.

27. The apparatus of claim 22, wherein the instructions are operable to cause the processor to:
receive, at the wireless modem, a signal of the plurality of signals from a wireless device within communication range of the wireless modem, the signal is received via a shared radio frequency spectrum band, and the signal is indicative of a position, a velocity, an acceleration, or a combination thereof, of the wireless device.

28. An apparatus for wireless communication at a wireless modem, comprising:
a processor;
memory in electronic communication with the processor; and
instructions stored in the memory and operable, when executed by the processor, to cause the apparatus to:
measure, at the wireless modem, a signal received from a motion sensor, wherein the wireless modem and the motion sensor are located on a same chip and coupled with a delivery package;
determine, at the wireless modem, that a collision event has occurred based at least in part on the measured signal; and
transmit, from the wireless modem to a distributor, an indication that the collision event has occurred based at least in part on the determining.

29. The apparatus of claim 28, wherein the instructions are operable to cause the processor to:
compare the signal to a threshold, wherein the determining comprises determining that the signal is greater than the threshold.

30. The apparatus of claim 28, wherein the signal indicates:
a position of the wireless modem, a direction of the wireless modem, a velocity of the wireless modem, an acceleration or deceleration of the wireless modem, or a combination thereof.

* * * * *